H. W. O'NEILL.
ELECTRICAL TESTING SYSTEM.
APPLICATION FILED DEC. 17, 1920.
1,404,311.
Patented Jan. 24, 1922.
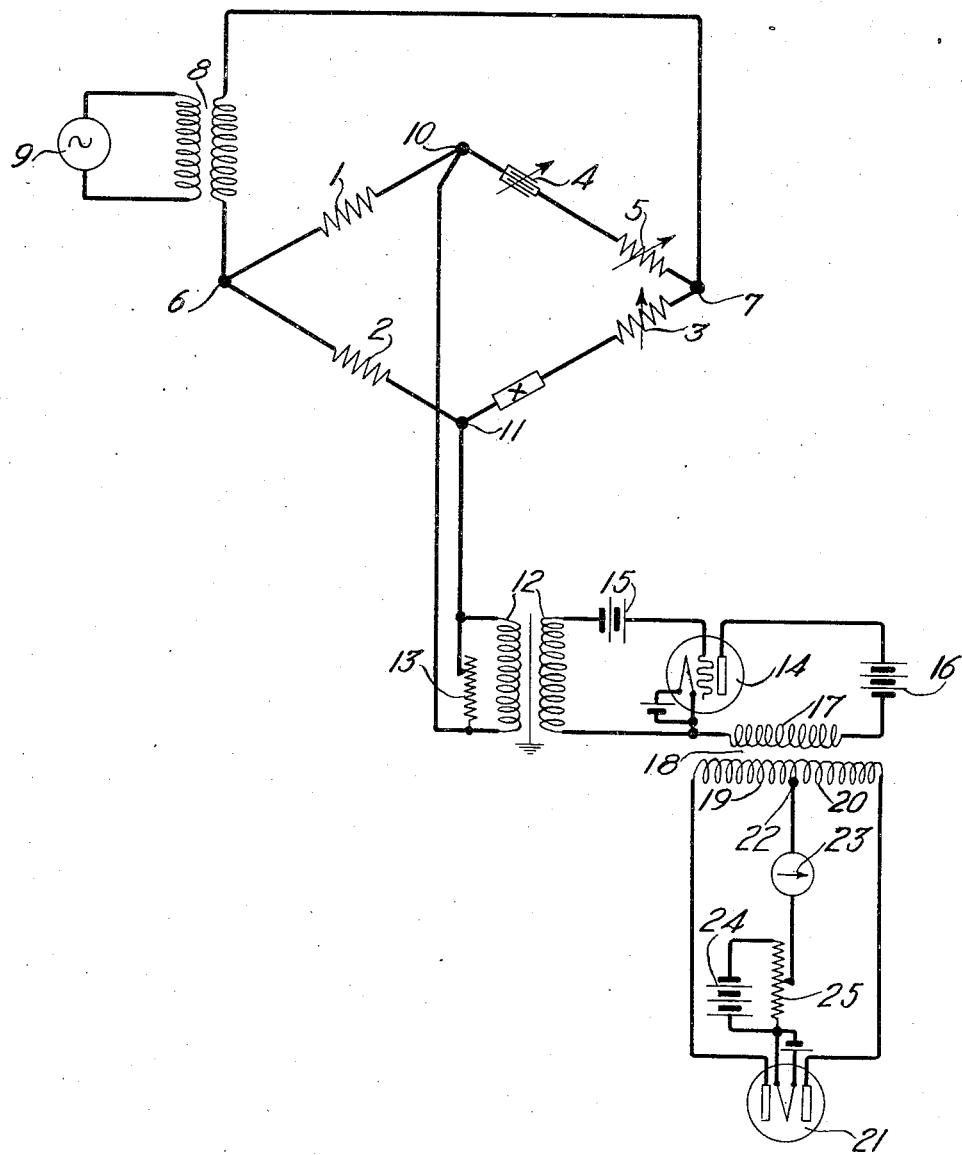
Inventor:
Henry W. O'Neill.
by Joel H. Palmer
Att'y.

UNITED STATES PATENT OFFICE.

HENRY W. O'NEILL, OF BROOKLYN, NEW YORK, ASSIGNOR TO WESTERN ELECTRIC COMPANY, INCORPORATED, OF NEW YORK, N. Y., A CORPORATION OF NEW YORK.

ELECTRICAL TESTING SYSTEM.

1,404,311. Specification of Letters Patent. Patented Jan. 24, 1922.

Application filed December 17, 1920. Serial No. 431,341.

*To all whom it may concern:*

Be it known that I, HENRY W. O'NEILL, a citizen of the United States, residing at Brooklyn, in the county of Kings, State of New York, have invented certain new and useful Improvements in Electrical Testing Systems, of which the following is a full, clear, concise, and exact description.

This invention relates to electrical testing systems, and more particularly to a system for measuring small electric currents.

It is the object of this invention to provide a system for testing alternating electrical currents which will be positive, sensitive and simple.

One of the difficulties encountered in the measurement of alternating currents is due to the fact that alternating current measuring devices are not sufficiently accurate or sensitive to permit exact determinations to be made. This invention provides a system using a direct current indicating means which, if it be of the "dead beat" type permits accurate measurements to be made with alternating currents having a frequency as low as five cycles per second. The use of low frequency alternating currents is advantageous in the measurement of resistances, for example, in that small current unbalances in the bridge network may be amplified many times by means of thermionic amplifiers whereas a similar amplification of direct current unbalances would be extremely difficult if not practically impossible.

By the invention in its preferred form, the alternating currents so amplified are rectified by means of differential arrangement of thermionic valves having a common branch, and measurement of the rectified current is made by means of a direct current milliammeter. One of the disadvantages of the use of thermionic valves is the variable Edison effect which occurs in the circuit due to the filament of the valve employed. In this improved system an opposing source of current is placed in circuit with the ammeter to counteract the effect and avoid the wandering zero of the instrument. The presence of the small opposing potential has been found to neutralize the Edison effect regardless of its natural erratic variations.

The invention will be more clearly understood by reference to the drawing in which the preferred form of the invention is shown as applied to the indication of current across the neutral points of a Wheatstone bridge.

A Wheatstone bridge having the ratio arms 1 and 2, an arm including an unknown element X, and a variable resistance 3, and an arm including a variable capacity 4 and a variable resistance 5, is supplied with alternating current at the points 6 and 7 by means of a transformer 8 with which is associated a source of alternating current 9. Across the neutral points 10 and 11 is bridged the primary of a transformer 12. A potentiometer 13 is provided to adjust the amount of current flow through the primary of the transformer 12. Transformer 12 is preferably of the grounded shield type. The secondary of the transformer 12 is connected with the input circuit of amplifier 14 shown here as a thermionic or audian type of amplifier. The source of direct current 15 is provided to maintain on the grid of the amplifier 14 a slightly positive charge. This charge is maintained so that that portion which is used of the characteristic curve for the amplifier will be that most nearly approximating a straight line.

The plate circuit of amplifier 14 is connected in series with the source of current 16 and the primary 17 of the transformer 18. Source of current 16 provides a continuous flow of current through the plate circuit of the amplifier, which flow of current is adapted to be varied in accordance with the alterations induced in the secondary of the transformer 12. The secondary of transformer 18 is divided into two portions 19 and 20, preferably approximately equal. The portions 19 and 20 are differentially connected with the thermionic valve 21, and have in common that portion of the circuit leading from the common point 22 to the filament of the valve 21. In this portion of the circuit from the common point 22 and the valve 21 is included a direct current indicating device 23.

Ordinarily in such an arrangement there will be some Edison effect between the filament terminals and the plate terminals of the valve 21. In accordance with this invention the source of direct current 24 is provided with an adjustable potentiometer arrangement of resistance 25. To maintain the plate slightly negative the potentiometer 25 is adjusted until the direct current indicating device 23 maintains a zero indication of current.

The invention has been shown in its application to a Wheatstone bridge for the measurement of capacitance since this type of work requires a very sensitive current indicating means to arrive at the accurate determinations of capacity. It is understood, however, that this invention may be used for the measurement of currents such as are employed in wireless telephony or telegraphy, telephone circuits and the like.

The Wheatstone bridge arrangement shown is of the ordinary type for measuring capacities and needs no further explanation of the principle or operation. It is understood that in the illustrated circuit the adjustable elements are balanced against the unknown elements until there is no flow of current between the points 10 and 11. Until such balance is obtained, however, such current as flows between the points 10 and 11 produces corresponding alternations in the secondary of the transformer 12 and is amplified by thermionic amplifier 14 in the plate circuit. These amplified alternations of the output circuit of the thermionic amplifier 14 cause corresponding fluctuations of current in the portions 19 and 20 in the secondary of the transformer 18. By virtue of the double valve 21, the circuits in which the portions 19 and 20 are connected are unilaterally conductive so that one half of the current wave produces a corresponding effect in portion 19 and the other half of the wave causes a corresponding effect in the portion 20. Thus induced, both currents flow successively through the instrument 23 to produce independent actuating impulses. It is, therefore, preferable that the portions 19 and 20 be similar, and that the characteristics of the two sides of the valve 21 be alike. The instrument 23 will preferably be "dead beat" if currents of very low frequency are employed, as the index of the instrument will then stand more nearly stationary.

The values of the current indicated by this system can be obtained by comparing the effect of some known standard on the system.

What is claimed is:

1. A system for measuring small variable electrical currents, which comprises means for rectifying such current, a current indicating means for the rectified current, and an opposing source of current to stabilize said current indicating means.

2. A system for measuring small variable electrical currents, which comprises a distortionless amplifier means associated with the source of such currents, double rectifying means for the current output of said amplifier means, a means to indicate the flow of such rectified current, and a source of current opposing the rectified current to stabilize the said current indicating means.

3. A system for measuring small variable electrical currents which comprises, a distortionless amplifier means associated with the source of such currents, a transformer primary in the output circuit of said amplifier means, a corresponding transformer secondary divided into a pair of equal sections, a pair of unilaterally conductive circuits differentially associated with the sections of said transformer secondary and having a branch circuit portion common to each, a current indicating means included in said common branch circuit, and an opposing source of current also included in said common branch circuit to stabilize said current indicating means.

4. In a system for measuring small variable currents, a transformer associated with the source of such current, a variable shunt potentiometer for adjusting the amount of current flowing through said transformer, thermionic amplifier means associated with the transformer, means including thermionic valve means to rectify the current output of said amplifier means, a unidirectional current indicating means for measuring the current so rectified, and a source of current to oppose the normal flow of current through the thermionic valve means.

In witness whereof, I hereunto subscribe my name this 16th day of December, A. D., 1920.

HENRY W. O'NEILL.